United States Patent
Shafigullin et al.

(10) Patent No.: US 9,794,280 B2
(45) Date of Patent: Oct. 17, 2017

(54) VERIFYING TEMPLATES FOR DYNAMICALLY GENERATED WEB PAGES

(71) Applicant: LinkedIn Corporation, Mountain View, CA (US)

(72) Inventors: Roman Shafigullin, Sunnyvale, CA (US); Yuji Kosuga, Sunnyvale, CA (US); Arvind Mani, Los Altos, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 28 days.

(21) Appl. No.: 14/841,594

(22) Filed: Aug. 31, 2015

(65) Prior Publication Data

US 2017/0063914 A1   Mar. 2, 2017

(51) Int. Cl.
  *G06F 21/00* (2013.01)
  *H04L 29/06* (2006.01)
  *G06F 17/30* (2006.01)
  *G06F 17/24* (2006.01)

(52) U.S. Cl.
  CPC ........ *H04L 63/1433* (2013.01); *G06F 17/248* (2013.01); *G06F 17/3089* (2013.01); *G06F 17/30893* (2013.01); *G06F 17/30896* (2013.01)

(58) Field of Classification Search
  CPC ......... G06F 17/30525; G06F 17/30867; G06F 17/30893; G06F 11/0793
  See application file for complete search history.

(56) References Cited

U.S. PATENT DOCUMENTS

| | | | |
|---|---|---|---|
| 8,051,465 B1* | 11/2011 | Martin | G06F 21/00 726/3 |
| 2008/0098028 A1* | 4/2008 | Shan | G06F 17/30893 |
| 2010/0017880 A1* | 1/2010 | Masood | G06F 21/51 726/24 |
| 2014/0047546 A1* | 2/2014 | Sidagni | G06F 21/577 726/25 |

\* cited by examiner

*Primary Examiner* — Ghazal Shehni
(74) *Attorney, Agent, or Firm* — Hickman Palermo Becker Bingham LLP

(57) ABSTRACT

A system and method for detecting encoding errors in a template used to generate a Web page. The template is analyzed using static analysis in a source code format, without rendering the Web page. A report can be generated including details on the detected errors and provide options on how to address the errors.

21 Claims, 3 Drawing Sheets

VERIFYING TEMPLATES FOR DYNAMICALLY GENERATED WEB PAGES

TECHNICAL FIELD

The present disclosure relates to testing the security of a Web page and, more particularly, to detecting errors in Web page templates.

BACKGROUND

Users today rely on the Internet for a variety of things. Users can find information on more mundane matters, such as checking for a recipe on how to make a particular dish or on more serious matters such as finding a new job, maintaining professional contacts, or finding people with the right qualifications to hire. This has led to very sophisticated Websites that include many features, often from different developers. These developers can be in-house (e.g., developers who work directly for the Website operator) or third-party developers (e.g., developers who create material for use with the Website but are not employed directly by the Website operator).

Especially for these feature rich Websites, securing them has become a particularly difficult task. Different features can be created by different developers, but they all need to work well together on each respective Website. An example of an error that can occur include encoding errors. For example, features on the Website may need to communicate with other features or data resources to exchange, update, create, or delete information. To do this, the features need to select the proper filters to make sure that the information is properly encoded. Failure to do this can result in duplication (or double encoding) of input information or execution of malicious scripts that can damage a computer or steal user information. However, due to the difficulty in identifying and properly fixing these errors, these errors are often undetected or, even when detected, improper fixes applied.

Therefore, there is a need for improved detection methods to prevent errors that occur when exchanging information among different features that may exist on a Website, such as analyzing Web page templates in source code without rendering the template.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
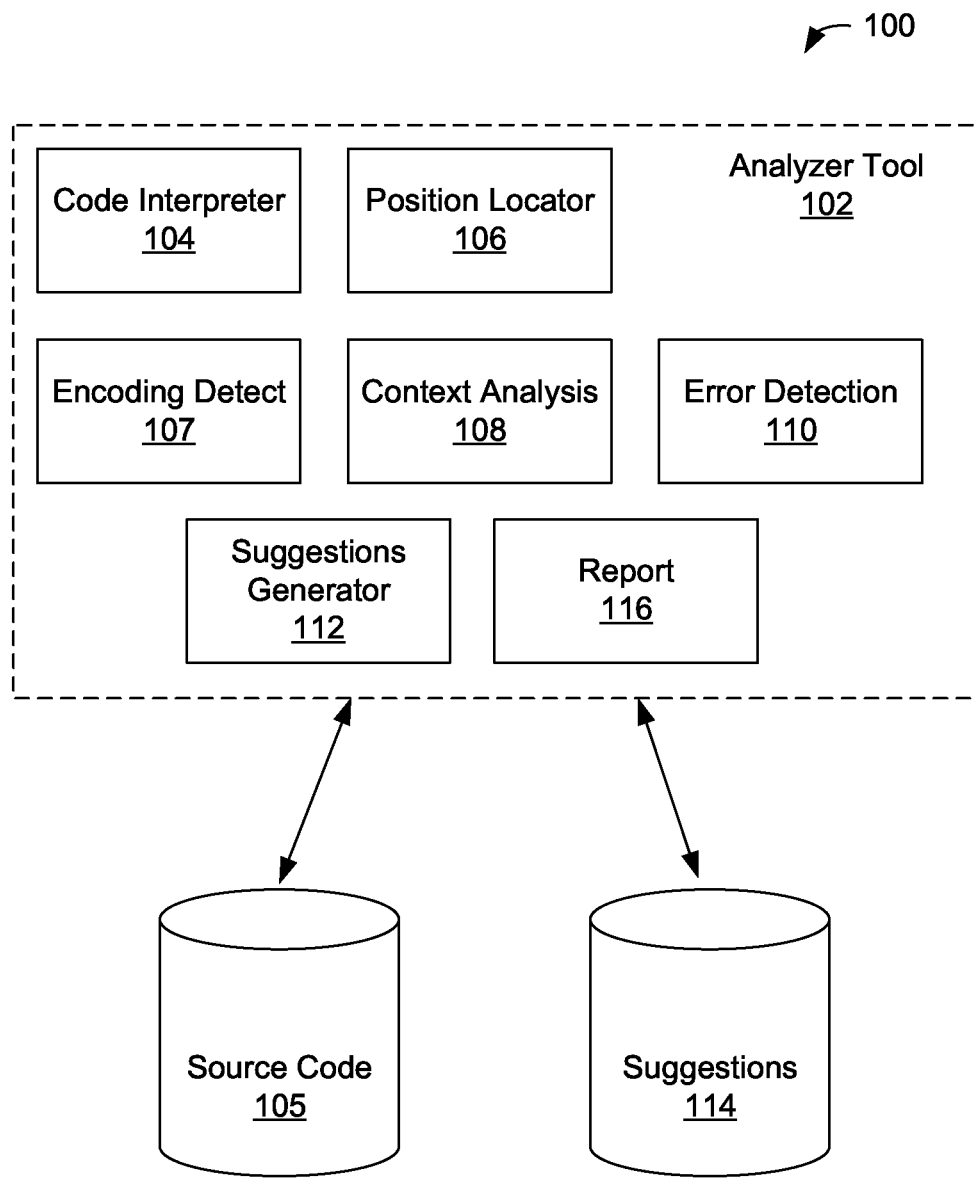
FIG. 1 illustrates an example system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques and a system are provided for testing the security of code and for providing insight on how the code can be fixed. As an example, an input may need information to be encoded in a HyperText Markup Language (HTML) format, but the information is supplied in a JavaScript format. To properly understand the information, the feature needs to change the encoding of the information. Failure to do so can result in security, duplication (or double encoding), or other errors. The system includes methods and techniques to detect and, optionally, provide suggestions on how to fix these errors.

One of these errors is cross-site scripting (XSS). An XSS vulnerability enables attackers to inject script into a Website. When users view the Website, they will retrieve the injected script from the Website onto their own computer (or client-side). Usually, a user's computers would not execute this script from a random source on the Internet. But, taking advantage of a computing paradigm known as the same-origin policy, the computer will allow the script to execute. In the same-origin policy, code and access to information allowed to a first origin (or Website) is allowed to all Web pages from the first origin. When the first origin is a trusted origin, this potentially allows an XSS vulnerability to occur.

To exploit a XSS vulnerability, a Website that is a trusted origin has a script from a potentially malicious source injected. Some popular locations where injection occurs is at fields, cookies, or headers of the Website. Since this Website is a trusted origin, a user viewing Web pages from this website will grant it a higher level of permissions than they would for untrusted sources. This allows the script from the potentially malicious source to load onto the user's computer. The user may not trust the source of the injected code, however since it was delivered by the trusted origin, the script executes and operates under the same permission granted to the trusted origin. Some examples of information an attacker can gain using XSS vulnerabilities include gaining elevated access-privileges to sensitive page content, session cookies, and a variety of other information maintained by the browser on behalf of the user.

As discussed elsewhere in this application, the system is capable of detecting encoding errors existing in a template. Not all of these encoding errors are vulnerable to cross-site scripting (XSS).

In one technique, the system includes a method for storing a template in a source code format. The template in the source code format includes instructions that can be dynamically executed to render a web page, but is not converted into executable code by the system at this stage. This includes analyzing source code without actually rendering a Web page during the analysis. This means that requests for data by the template are not made when analyzing the source code. The system scans the template in the source code format for a first location. The first location includes a location in source code, where the source code includes a field asking for information that is not defined in the source code itself. This may include fields identified by the system where a user may insert data. For example, the first location can include a location in a template and the template is used to render HTML. The system determines an encoding context for the first location. The encoding context specifies what kind of information can be properly received at the first location. The system verifies, based on the template in source code format, whether an error would occur based on a first set of filters already existing at the first location. The system reviews the source code to see if filters have been specified at the first location. For example, in the Dust programming language, a programmer can specify a filter to be applied at a given location using a pipe character, followed by one or more characters specifying which encoding to use. If the system determines that an error may occur based on the existing filters and the encoding context, then the system may determine a suggestion on how to fix the error. The system can include more than one suggestion, as well as an explanation of what suggestion to apply in different scenarios. The suggestions may also include information of when to choose one suggestion over another suggestion, depending on the different needs of a programmer.

In an embodiment, the system detects a cross-site scripting (XSS) error. However, the system is not limited to only XSS errors. In another embodiment, the system includes robust features to detect a variety of different encoding errors. As an example, in some languages, if auto-escaping is improperly used, then this can result in a double encoding (or duplication of input) error. This will confuse systems that expect only one input, to receive the input more than once. Although it may not result in a security vulnerability, fixing this error helps to ensure an overall higher level of code quality.

In an embodiment, the system includes determining what set of filters should be applied to a position. This can result in removing filters already present at the position or adding filters already present at the position. The system will optionally also locate a new position where the filters should be added in the template in the source code format. The new position can be a different position than the one where the filters were previously specified in the source code. The new position can include a reordering of one or more filters that were previously applied.

In an embodiment, the system includes finding more than one position in the template to perform analysis. This includes identifying, using the template, a new location and determining a new encoding context for the new location, where the new encoding context includes at least one encoding format that can be properly received at the new location. The system verifies based on the template whether an error would occur based on a third set of filters already existing at the first location and determines filters to be used to address the second location if an error would result. The encoding context at the position and the new position can be the same or different. This depends on the needs of the programmer at each respective position.

In an embodiment, the system includes positions in the template where there are no specified filters. This means that a programming language determines what filters to apply. In another embodiment, the system includes a different interpreter for the template, depending on what programming language the template is specified in. If an incorrect interpreter is used, the system will likely fail to understand the source code and return errors because of substantive and syntax failures in understanding the source code.

Example System Implementation

FIG. 1 illustrates an example system 100 in which the techniques described may be practiced according to certain embodiments. System 100 is a computer-based system. The various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

FIG. 1 illustrates an example computer-based system 100 in which the techniques described may be practiced according to certain embodiments. The various components of system 100 are implemented at least partially by hardware in one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

System 100 includes an analyzer tool 102. The analyzer tool 102 includes various modules to perform static source code analysis. A code interpreter module 104 retrieves source code from a source code database 105. The source code database 105 includes any source code to be tested for encoding errors. In one embodiment, source code from weakly typed or hybrid typed languages are included in the source code database 105. Some examples of weakly typed languages include Dust, Rust, ember.js, Groovy Server Pages (GSP), or Java Server Pages® (JSP). Weakly or hybrid typed languages will often perform limited type conversions. For example, if no filter is specified by the source code, then a compiler executing the source code may default to a filter (e.g., HTML, JavaScript®, or other). This can result in an improper conversion occurring, since the position will include a filter that does not belong, causing improperly encoded information. This can produce unpredictable results as discussed in greater detail elsewhere in this application.

In another embodiment, source code from one or more of strongly typed, weakly typed, or hybrid languages are included in the source code database 105. Some examples of strongly typed languages include Java®, Pascal, Ada, and C. As opposed to a weakly or hybrid typed language, a strongly typed language is likely to generate an error or refuse to compile source code if the argument passed to a function does not closely match the expected type. This may make encoding vulnerabilities more difficult to exploit in these languages. Java, Java Server Pages, and JavaScript are registered trademarks of Oracle Corporation.

The code interpreter module 104 is responsible for reading and understanding the source code, so that other modules can access the information stored as source code. A position locator module 106 goes through the source code to determine areas of interest (or positions or vectors) for the analyzer tool. Areas of interest includes areas in source code where input is received and what is received is not explicitly defined by the source code. Some examples of this include parameters, variables, arguments, tag identifiers, or other input information. This input can be in a variety of various data types, such as integers, Booleans, characters, floating-point numbers, alphanumeric strings, array, complex data types, or other data types.

An encoding detection module 107 determines from the source code what filters are included with the source code for each position determined by the position locator module 106. This can include one, two, three, or more filters. The system can also determine that, if there is no filter explicitly included in the source code that a default filter is included. The default filter can be dependent on a specific source code language used by the source code. As one example, a default filter for the Dust language is an HTML filter. As another example, a default encoding for the JSP language is an HTML encoding. The term "filter" is commonly used in referring to a mechanism to make encoding changes in the Dust programming language. For purposes of this application, "filter" is used interchangeably in other programming languages as a mechanism to make encoding changes.

A context analysis module 108 determines a context for each position determined by the position locator module 106. A single piece of source code can include one or more positions identified by the position locator module 106. The context is used by the system to determine what the proper encoding or filters should be used at a given position.

In an embodiment, based on a template and a specific programming language the template is written in, the system determines a context for positions in the source code. If a template is in the Dust programming language, then the system determines that HTML and Dust will likely need to be included as filters. In another embodiment, depending on where in the source code a position occurs, different encoding may be needed. Some examples of different contexts include: HTML element body, HTML attribute, JavaScript, JavaScript string, an indication of the source code type (e.g., Dust, JavaScript, or other), or other contexts.

In an embodiment, the system includes determining a context that includes an outer (or final) encoding and an inner encoding. This may be done for one or more positions (or fields) detected by the system. The system suggests (or forces) an appropriate outer encoding according to a specific context determined by the system, so that errors will not occur (e.g., selecting the proper encoding for a specific input field to prevent XSS errors). Some examples of different contexts that may be determined by the system are provided following, along with a corresponding suggestion for an outer encoding to include according to each context:

(1) HTML attribute context: HTML encoding;
(2) HTML body context: HTML encoding;
(3) JavaScript String context: JavaScript string escaping; and
(4) JavaScript non-string context: JavaScript Object Notation (JSON) encoding.

In a further embodiment, an inner encoding determined by the system is preserved. The system determines all encoding (e.g., inner and outer encoding) to be included at a specific field. An example of determining contexts while suggesting an outer encoding and preserving inner encoding is provided following, to illustrate how contexts are used in the system: The system determines that source code includes a field "{foo}" in a JavaScript context. The system determines an outer encoding for the field is a HTML encoding (instead of JavaScript string escaping). The system determines a suggested encoding should be "{foo|h|js}." This adds outer JavaScript escaping, while preserving the HTML escaping. This will prevent default HTML escaping, due to the order of the applied filters. However, the system preserves the HTML encoding so that potential XSS errors when the source code is executed (e.g., when the source code is executed as an object by another feature which relied on the HTML encoding) are avoided.

In another example, if the HTML encoding were not included, such as an encoding including "{foo|s}" in a JavaScript context, then a suggested encoding may include "{foo|j|s}" without including the HTML encoding.

Unlike a parser or compiler, the context analysis module 108 may determine from where in the source code a position is what the context should be. On the other hand, a Dust compiler executing is not aware of its context because a Dust compiler does not parse HTML. Also, an HTML parser does not understand Dust so an HTML parser does not recognize context.

An error detection module 110 determines whether an error might occur at the given location. This includes determining whether there is an error in the filters being applied at any given position. For example, even if a template includes a vulnerability (e.g., mistake in the encoding), executing the template does not always result in an error unless improper input is provided to the template. The system provides corrective steps to fix this error, before an error has a chance to be pushed into a live environment.

A suggestions generator module 112 determines how to fix errors by accessing samples and templates stored in a suggestions database 114. When an error in the encoding is identified, the system searches the suggestions database 114 to determine what error scenario has resulted, as well as different options to resolve the error scenario. At times, more than one option can be suggested for a single error scenario.

A reporting module 116 generates a report including detected encoding errors and, optionally, suggestions on how to fix them. As discussed previously, more than one suggestion can be determined for a single error. The reporting module 116 may process these suggestions to provide a natural language explanation of the error and suggestions to display to a user.

Databases 105 and 114 may be any suitable storage device such as one or more hard disk drives, memories, or any other electronic digital data recording device configured to store data. Although the databases are each depicted as a single device in FIG. 1, each database may span multiple devices located in one or more physical locations. For example, source code database 105 may be one or nodes located at one or more data warehouses. Additionally, in one embodiment, source code database 105 may be located on the same device(s) executing the analyzer tool 102. Alternatively, the databases 105 and 114 may be located on a separate device (s) executing the analyzer tool 102.

Example of Filters in Dust Programming Language

The following provides greater detail of how filters are implemented in the Dust programming language. However, as described elsewhere in this application, other programming languages can be used with the teaching described in this application.

The Dust programming language enables the concept of escaping, meaning that for a sequence of characters until a special character is received (e.g., the pipe character in Dust), a first portion of the sequence is treated in one way, different than another way for a second portion after the special character. Usually, this means that the first portion is treated as input to be processed and the second portion is treated as non-executable code information (e.g., defines what escapes are needed). Some common filters that are built into Dust include: h forces HTML escaping, j escapes JavaScript strings, and s disables automatic escaping. If multiple escapes are needed, then filters can be chained. Not including a proper escape can sometimes allow malicious input to be injected. As an example, if a HTML escape is needed but not included, then potential HTML script that is injected may be executed (since no escape was present).

Process Overview

Some specific flows for implementing a technique of an embodiment are presented below, but it should be understood that embodiments are not limited to the specific flows and steps presented. A flow of another embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

Figure 2:
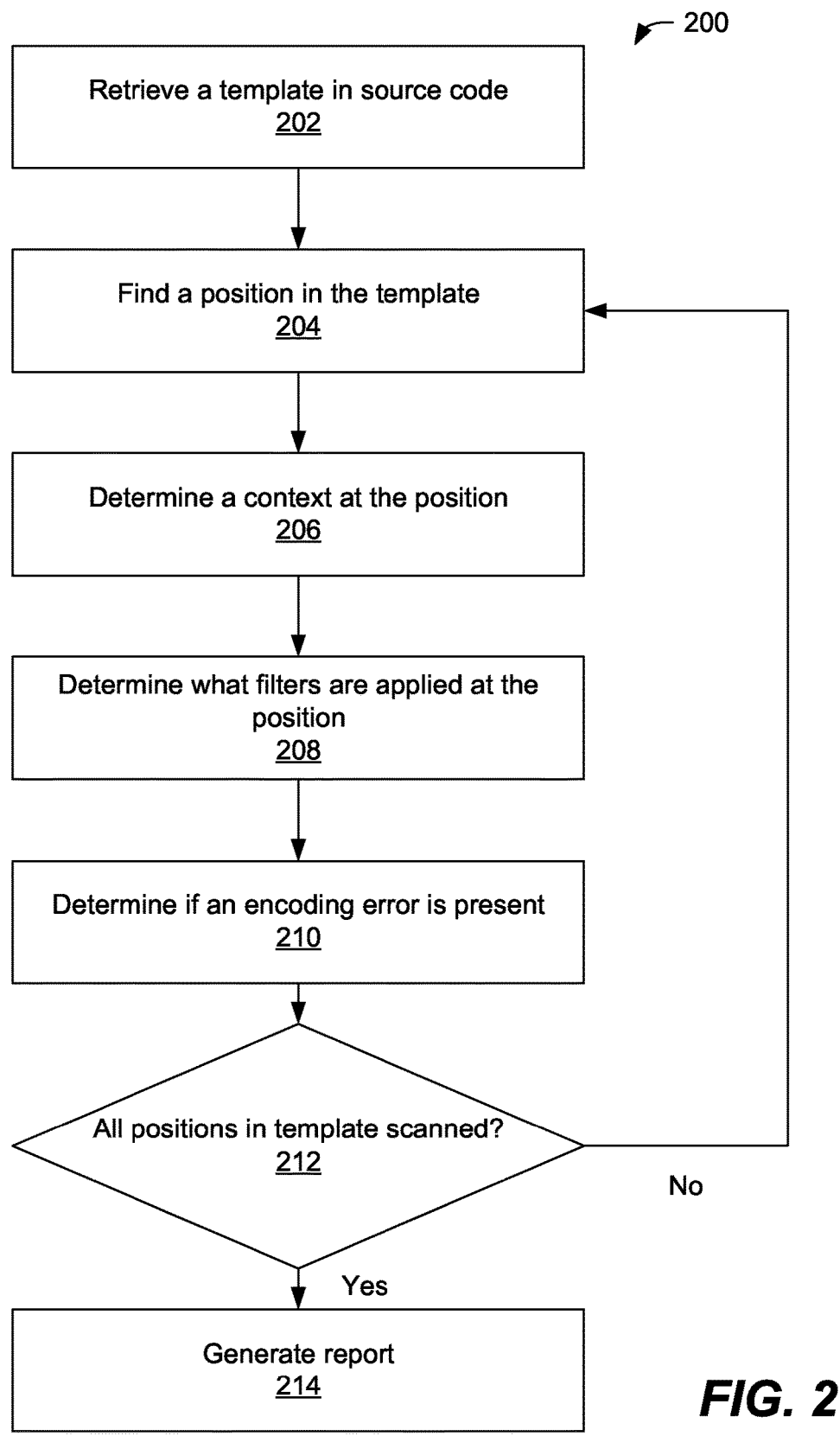
FIG. 2 shows an example flowchart of a method for detecting encoding errors using static code analysis.

FIG. 2 is a flowchart that depicts an example process 200 for detecting encoding errors using static code analysis, in an embodiment. In a step 202, the system retrieves a template in source code format. The template is used to determine at least one element (or feature) of a Web page, but does not need to include all the code to determine the layout and information to display on the Web page.

In a step 204, the system finds a position in the template. This is usually a portion of the source code where input is requested from an external source, such as a database, user input, or from other features that will execute in conjunction with the template source code when the Web page is rendered.

In a step 206, the system determines a context at the position. This is used to understand what kind of filters should be applied at this location, based on the source code.

In a step 208, the system determines what filters are applied at the position. The system can analyze the template in source code format to determine what filters have already been included at the location by a programmer who created the template. For example, in the Dust programming language, the pipe character is used to control what filters are present at a position. One or more filters can be specified at the position, including zero filters that causes a default to be applied to the position.

In a step 210, the system determines if an encoding error is present. The system can compare the filters determined by the context and the filters already applied at the position. In an embodiment, other encoding errors, including ones not exploitable in an XSS situation are included when determining whether an error has occurred.

In a step 212, the system continues in the source code to determine whether all positions in the template have been scanned. If no, then the system returns to step 204 to determine the next position. If yes, the system proceeds onto step 214.

In the step 214, the system generates a report for the scan. The report may indicate more than one position, as well as details on any encoding issues found by the system.

Other flows of the system can include more or fewer steps. For example, the system can detect if a new position remains in a last determined context, if it has not exited the previously determined context. In this case, the system does not need to determine a context for every position. This makes the system more efficient by reducing the number of steps required to complete a scan. In another embodiment, process 200 involves reordered steps. For example, determining a context at a position can occur after determining what filters are applied at the position.

Reporting Detected Errors

In an embodiment, the system includes a reporting module. The report generated includes various sections that help identify, understand, and address each particular issue. Some of the sections includes in a sample report are included in Table 1 below.

TABLE 1

Reports Sections

| Section | Description |
| --- | --- |
| Issue type | Issue name and its associated issue identifier. The issue identifier is indexed to different types of issues that can be identified by the scanner. |
| Location | A file name as maintained by a file system and the line number in the file where the issue appears. |
| Context | The system determined context of where the issue appears (e.g., HTML, JavaScript, or other). |
| Syntax | Where in the syntax of the source code the issue appears |
| Code | Snippet of source code possibly vulnerable. |
| Fix examples | Examples in source code format on how to potentially fix the identified issue. Reviewers of the report can choose to adopt, modify, or ignore these examples. |
| Comments | Comments using natural language determined by the system on how to address the issue. Can include comments for more than one fix example as discussed above, as well as reasons for why one fix should be chosen over another. |
| Show Lines | Lines surrounding the code of interest. The right angle bracket '>' indicates the line in which the code appears. |

Examples of reports that are generated in a specific embodiment follow. Other embodiments can include more or less information as shown in these examples, as well as different organization of information as found in these reports.

Table 2 shows an example of JavaScript encoding with an XSS vulnerability. In this example, the position of source code with {name} should be replaced by {name|h|j|s}. This means that escaping for HTML, JavaScript, and disabling auto escaping should have been included. Since {name} was used inside of JavaScript, meaning the scripts inside of <script> tag is JavaScript, {name} should have included |j, which applies JavaScript encoding to the actual name value.

templates, even if a particular encoding error is not exploitable at the moment (e.g., may be exploitable in the future or result in non-security type errors). A non-exhaustive list of other encoding issues that the system can detect include: content security policy violation, invalid use of inline par-

TABLE 2

Example Report 1

[ Issue Type ] Lack of Context Encoding (id:JSS_h)
[ Location ] //testcode/workspace/suggested_skills.tl:76
[ Context ] JavaScript String
[ Code ] {name}
[ Fix Example ] {name|h|j|s}
[ Comments ]
* "|j" filter is required in a JavaScript String context.
[ Show Lines ]
72: <script type="text/javascript" id="control-custom-script-suggested-skills" class="li-control">
73: {! For some reason, anonymous functions don't get executed well when this is inserted and
74: found dynamically. !}
75: var executeImmediately = function( ) {
> 76: var form = YDom.get('{name}_id'),
77: maxSkillsParam = YDom.getElementsByClassName('max-skills', 'input', form)[0];
78:
79: maxSkillsParam.value = YDom.getElementsByClassName('jellybean', 'li', form).length;
80:

Table 3 shows an example of HTML encoding with another XSS vulnerability. In this example, the position of source code with {i18n_parent_fos_link|s} did not include HTML encoding. The system suggests developers to take one of three options: (1) to replace this code with {i18n_parent_fos_link} for HTML-encoding all characters in the actual i18n_parent_fos_link value, (2) use {i18n_parent_fos_link|et|s} for HTML-encoding only characters that did not yet get HTML-encoded, or (3) use {i18n_parent_fos_link|mk|s} for allowing the use of HTML tags from a very limited set of HTML tags that a security team has approved in advance.

tials, deprecated use of @if, lack of enclosing quotes, double-encoding, use of a deprecated flag, html sanitization is required, or any combination of these.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field pro-

TABLE 3

Example Report 2

[ Issue Type ] Lack of Context Encoding (id:HB_s)
[ Location ] //testcode/workspace/fos_summary.tl:28
[ Context ] HTML Element Body
[ Code ] {i18n_parent_fos_link|s}
[ Fix Example ]
{i18n_parent_fos_link} or {i18n_parent_fos_link|et|s} or {i18n_parent_fos_link|mk|s}
[ Comments ]
* HTML encode is required in an HTML element body context.
* If "i18n_parent_fos_link" is not HTML encoded string, please use {i18n_parent_fos_link},
otherwise check if "i18n_parent_fos_link" is HTML encoded {i18n_parent_fos_link|et|s} or if
it contains HTML markup {i18n_parent_fos_link|mk|s}. go/dustfilters
[ Show Lines ]
24:
25:{@eq value="true" key="{global_requestParams.nr}"}
26: <div class="edu-alert" role="alert">
27: <p>
> 28: <strong><a href="#" class="more">{i18n_parent_fos_link|s}</a></strong>
29: </p>
30: <button class="dismiss" title="{i18n_close}">
31: {i18n_close}
32: </button>

In an embodiment, the system detects encoding errors that are not exploitable as part of an XSS injection. These errors can be included in reports (e.g., the reports shown in Tables 2 and 3) as issues to be addressed. As discussed elsewhere in greater detail, the system includes suggestions to fix these encoding errors. This ensures that the system produces safe grammable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
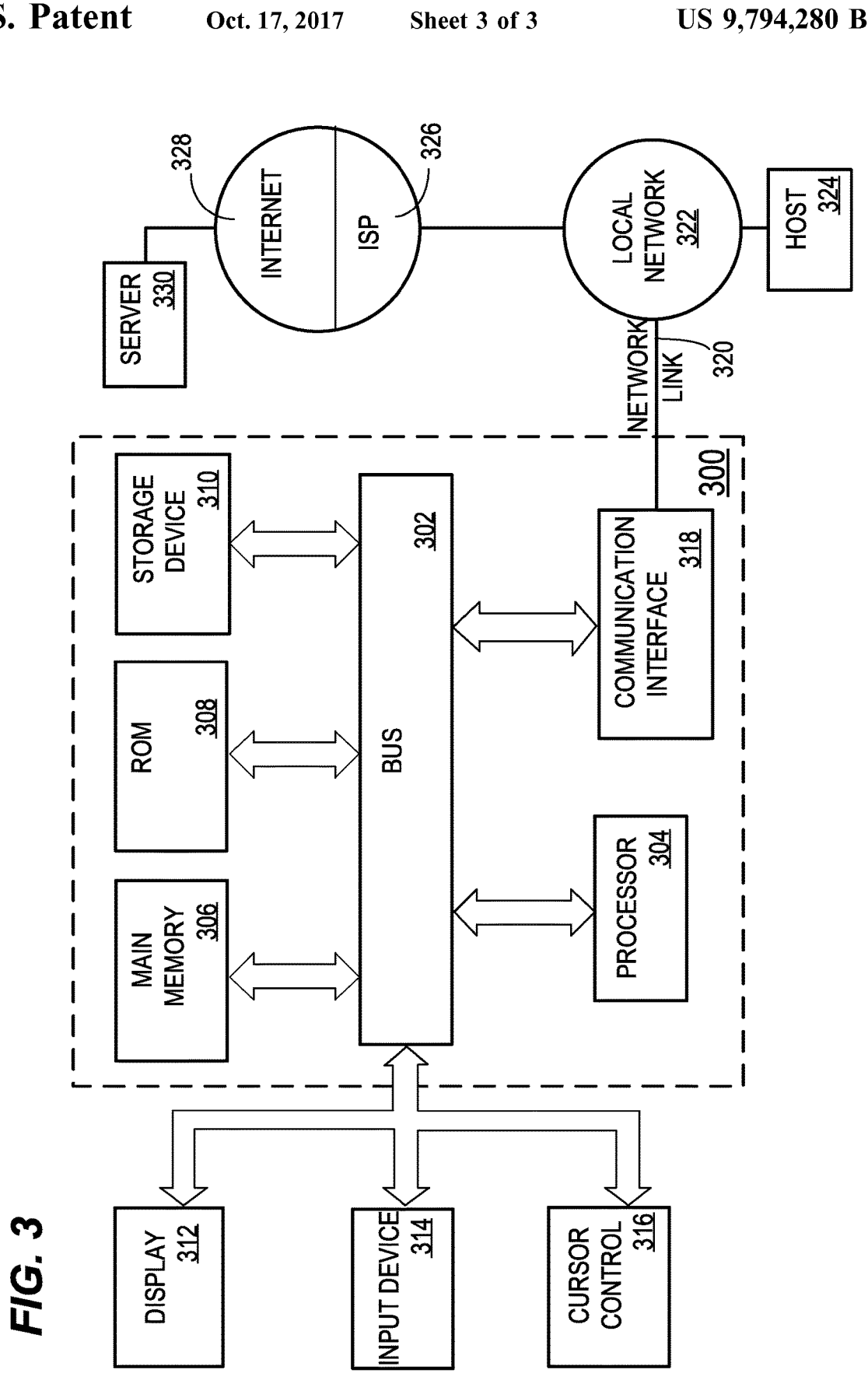
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a template in a source code format, wherein the template comprises instructions that can be dynamically executed to render a web page and the instructions include one or more locations where an input of data is to be received when a web page will be generated based on the template;
    identifying a first location within the template;
    determining, from among a plurality of possible encoding formats, a first encoding context for the first location, wherein the first encoding context comprises at least one encoding format that can be properly received at the first location; and
    verifying, based on the template, whether an error would occur based on a first set of filters already existing at the first location and the first encoding context.

2. The method of claim 1 wherein the error comprises a cross-site scripting (XSS) error.

3. The method of claim 1 wherein the error comprises a double encoding error.

4. The method of claim 1 wherein the identifying using the template comprises analyzing the template in the source code format without rendering the template to create a first Web page.

5. The method of claim 1 wherein the identifying the first location and determining the first encoding context for the first location occurs using the source code format of the template.

6. The method of claim 1 further comprising
    determining a second set of filters to be used at the first location if an error would occur based on the first set of filters.

7. The method of claim 6 wherein the determining the second set of filters to be used to address the first location comprises:
    including the first set of filters already existing at the first location in the second set of filters; and
    including a first filter in the second set of filters, wherein the first filter was not included in the first set of filters.

8. The method of claim 6 wherein the determining the second set of filters to be used at the first location comprises determining a first position in the template to insert the second set of filters.

9. The method of claim 1 wherein the first location comprises an input of weakly typed data.

10. The method of claim 1 wherein the first encoding context comprises Hypertext Markup Language (HTML).

11. The method of claim 1 wherein the first encoding context further comprises JavaScript.

12. The method of claim 1 wherein the template includes at least one request to a data resource located and defined separately from the template.

13. The method of claim 1 further comprising:
    identifying a second location within the template;
    determining a second encoding context for the second location, wherein the second encoding context comprises at least one encoding format that can be properly received at the second location;
    verifying, based on the template, whether an error would occur based on a second set of filters already existing at the second location; and
    determining a third set of filters to be used to address the second location if the error would occur based on the second set of filters.

14. The method of claim 13 wherein the first and second encoding contexts comprise different encoding contexts.

15. The method of claim 13 wherein the first and second encoding contexts comprise the same encoding context.

16. The method of claim 1 wherein the first set of filters comprises an empty set of filters.

17. The method of claim 1 further comprising:
    determining a template language for the template; and
    based on the template language, selecting a source code interpreter for identifying the first location.

18. A system for a software tool comprising:
    one or more processors;
    one or more computer-readable media carrying instructions which, when executed by the one or more processors, cause:
        storing a template in a source code format, wherein the template comprises instructions that can be dynamically executed to render a web page and the instructions include one or more locations where an input of data is to be received when a web page will be generated based on the template;
        identifying a first location within the template;
        determining, from among a plurality of possible encoding formats, a first encoding context for the first location, wherein the first encoding context comprises at least one encoding format that can be properly received at the first location;
        verifying, based on the template, whether an error would occur based on a first set of filters already existing at the first location and the first encoding context; and
        determining a second set of filters to be used at the first location if an error would occur based on the first set of filters.

19. The system of claim 18 wherein the error comprises at least one or a cross-site scripting (XSS) error or a double encoding error.

20. The system of claim 18 wherein the identifying using the template comprises analyzing the template in the source code format without rendering the template to create a first Web page.

21. The method of claim 1 further comprising:
    generating a natural language explanation of the error and providing one or more suggestions to rectify the error.

* * * * *